US012560701B2

(12) United States Patent

Massimi et al.

(10) Patent No.: US 12,560,701 B2

(45) Date of Patent: Feb. 24, 2026

(54) INNOVATIVE METHOD FOR THE DETECTION OF DEFORMED OR DAMAGED STRUCTURES BASED ON THE USE OF SINGLE SAR IMAGES

(71) Applicants: Terna S.P.A., Rome (IT); Planetek Italia S.R.L., Bari (IT)

(72) Inventors: Vincenzo Massimi, Bari (IT); Davide Oscar Nitti, Bari (IT); Raffaele Nutricato, Bari (IT); Sergio Samarelli, Bari (IT); Marco Forteleoni, Rome (IT); Sabrina Viola, Rome (IT); Anna Esposito, Rome (IT); Emilia Montesarchio, Rome (IT)

(73) Assignees: Terna S.P.A., Rome (IT); Planetek Italia S.R.L., Bari (IT)

( * ) Notice: Subject to any disclaimer, the term of this patent is extended or adjusted under 35 U.S.C. 154(b) by 453 days.

(21) Appl. No.: 17/993,921

(22) Filed: Nov. 24, 2022

(65) Prior Publication Data

US 2023/0228868 A1 Jul. 20, 2023

(30) Foreign Application Priority Data

Nov. 24, 2021 (IT) .......................... 102021000029729

(51) Int. Cl.
*G01S 13/90* (2006.01)
*G06T 7/00* (2017.01)

(52) U.S. Cl.
CPC .......... *G01S 13/9021* (2019.05); *G06T 7/001* (2013.01); *G01S 13/9052* (2019.05); *G06T 2207/20081* (2013.01)

(58) Field of Classification Search
CPC ............. G01S 13/9021; G01S 13/9052; G01S 7/412; G01S 7/417; G01S 13/867;
(Continued)

(56) References Cited

U.S. PATENT DOCUMENTS

2012/0127028 A1* 5/2012 Bamler ................... G01C 11/00
342/25 C
2012/0315920 A1* 12/2012 Hampapur ............ H04W 24/08
455/456.1

(Continued)

OTHER PUBLICATIONS

Matin S., Pradhan B. Earthquake-Induced Building-Damage Mapping Using Explainable AI (XAI). Sensors (Basel). Jun. 3, 20210 (Year: 2021).*

(Continued)

*Primary Examiner* — Vladimir Magloire
*Assistant Examiner* — Anna K. Gosling

(57) ABSTRACT

The invention concerns a method (1) to detect deformations of, and/or damages to, structures permanently arranged on the earth's surface. In particular, said method (1) comprises: acquiring (11) georeferencing data indicative of geographical reference positions of predefined points of interest of a given structure to be monitored permanently arranged on the earth's surface, wherein said predefined points of interest are representative of a 3D geometry of the given structure without deformations and damages; acquiring (12) a SAR image of an area of the earth's surface where the given structure is arranged, wherein said SAR image is associated with a given reference coordinate system; transforming (13) the geographical reference positions of the predefined points of interest into corresponding expected positions in the given reference coordinate system associated with the acquired SAR image so as to carry out a reprojection of the 3D geometry of the given structure without deformations and damages on the acquired SAR image; identifying (14) in the acquired SAR image the predefined points of interest of the given structure; determining (15) actual positions in the given reference coordinate system associated with the acquired SAR image of the predefined points of interest identified in said SAR image; making a comparison (16)

(Continued)

Acquisition of georeferencing data of a lattice support to be monitored 11

Acquisition of a SAR image of an area of the earth's surface where the lattice support is arranged 12

Transformation of geographic coordinates of points of interest of the lattice support into corresponding first coordinates in the coordinate system of the acquired SAR image 13

Identification of the points of interest of the lattice support in the acquired SAR image 14

Determination of second coordinates in the coordinate system of the acquired SAR image of the identified points of interest 15

Comparison between the first and second coordinates 16

Detection of deformations and/or damages of the lattice support 17

Estimation of the detected deformations and/or damages 18 between the expected positions of the predefined points of interest and the corresponding actual positions in the acquired SAR image; and detecting (17) one or more deformations of, and/or one or more damages to, said given structure on the basis of the comparison made.

10 Claims, 2 Drawing Sheets

(58) Field of Classification Search
CPC ....... G01S 13/90; G01S 13/865; G06T 7/001; G06T 2207/20081
See application file for complete search history.

(56) References Cited

U.S. PATENT DOCUMENTS

| | | | |
|---|---|---|---|
| 2020/0294263 A1 | 9/2020 | Cho et al. | |
| 2024/0020969 A1* | 1/2024 | Schenkel | G06T 7/001 |
| 2024/0402333 A1* | 12/2024 | Jumonji | G01B 15/06 |

OTHER PUBLICATIONS

Tampubolon, T., Juliani, R., Hutahean, J., & Yanti, J. (2020). Deformation mapping of the 2018 sulawesi earthquake by satellite radar and optical remote sensing. Journal of Physics: Conference Series, 1428(1) (Year: 2020).*

European Search Report and the European Search Opinion Dated Apr. 3, 2023 From the European Patent Office Re. Application No. 11106857.9. (10 Pages).

Rapporto di Ricerca e l'Opinione Scritta [Search Report and the Written Opinion] Dated Jul. 20, 2022 From the Ministero Dello Sviluppo Economico, Direzione Generale Sviluppo Produttivo e Competitivita, Ufficio Italiano Brevetti e Marchi Re. Application No. IT 202100029729. (18 Pages).

Belloni et al. "COSMO-SkyMed Range Measurements for Displacement Monitoring Using Amplitude Persistent Scatterers", 2020 IEEE International Gcoscience and Remote Sensing Symposium, IGARSS 2020, XP055938862, Waikoloa, HI, USA, Sep. 26-Oct. 2, 2020, p. 2495-2498, Sep. 26, 2020.

Eineder et al. "Imaging Geodesy—Toward Centimeter-Level Ranging Accuracy With TerraSAR-X", IEEE Transactions on Geoscience and Remote Sensing, XP011343703, 49(2): 661-671, Feb. 1, 2011.

* cited by examiner

INNOVATIVE METHOD FOR THE DETECTION OF DEFORMED OR DAMAGED STRUCTURES BASED ON THE USE OF SINGLE SAR IMAGES

RELATED APPLICATION

This application claims the benefit of priority of Italy Patent Application No. 102021000029729 filed on Nov. 24, 2021, the contents of which are incorporated by reference as if fully set forth herein in their entirety.

FIELD AND BACKGROUND OF THE INVENTION

The present invention concerns, in general, an innovative method for the detection of deformed or damaged structures based on the use of single images of the synthetic aperture radar type ("Synthetic Aperture Radar"—SAR).

More specifically, the present invention relates to a method exploiting single satellite or aerial SAR images to detect deformations of, and/or damages to, structures of interest permanently arranged on the earth's surface.

The present invention can, for example, be advantageously exploited to detect deformations of, and/or damages to, supports of overhead power lines, for example lattice supports for Low Voltage (LV), Medium Voltage (MV) or High Voltage (HV) overhead power lines.

More generally, the method according to the present invention can be advantageously exploited to detect, i.e. identify, deformations of, and/or damages to, structures or infrastructures of interest of any type permanently arranged on the earth's surface.

In this regard, it is important to underline that, in the following, the present invention will be described, for simplicity and purely by way of example, but absolutely without any limitation or restriction, explicitly referring to the detection of deformations of, and/or damages to, lattice supports for overhead power lines, without loss of generality.

In fact, as just explained above, the method according to the present invention can be advantageously exploited, without requiring any substantial modification, to detect deformations and/or damages, not only of other types of supports for overhead power lines, but also of any other type of structures/infrastructures installed/mounted on, and anchored to, the ground (e.g., buildings, bridges, viaducts, dams, etc.) and even of permanent structures/infrastructures of the offshore type (i.e. arranged in the open sea) such as, for example, oil platforms anchored to the seabed.

As is known, SAR technology is characterised by:
excellent so-called "all-weather" operational characteristics (in fact, the SAR sensors can operate, for example, differently from the optical sensors, both day and night and with any meteorological and atmospheric condition); as well as
excellent remote sensing capabilities (in particular, in terms of resolution and, in the case of satellite SAR sensors, also of global coverage).

By virtue of such operational characteristics and remote sensing capabilities, SAR technology is therefore currently exploited for many applications, including the detection and estimation of ground deformations or targets of interest.

In particular, the known techniques for the detection and estimation of deformations based on SAR technology (typically of the interferometric type) are generally based on a cross-correlation analysis of at least two remotely sensed SAR images with the same shooting geometry both before and after the occurrence of a deformation.

Therefore, the applicability of such techniques is highly limited by the availability of remotely sensed SAR images before the occurrence of a deformation (which is not always guaranteed), as well as by the possibility of acquiring further SAR images after the occurrence of the deformation with the same shooting geometry used for the pre-deformation images.

In the specific case of overhead power line supports, being able to quickly identify a damaged support is crucial for those working in this sector, in particular for the power grid operators, who need to promptly obtain such information in order to be able to proceed, as soon as possible, with the corresponding repair and restoration activities, in order to avoid or, in any case, minimise any service interruption.

Unfortunately, however, the currently known techniques for the detection and estimation of deformations based on SAR technology are absolutely unable to guarantee a prompt detection of a deformation of an overhead power line support (and, therefore, do not allow a prompt repair/restoration thereof), due to the aforementioned limitations of such technologies, i.e. the need to have remotely sensed SAR images available with the same shooting geometry both before and after the deformation of the support.

SUMMARY OF THE INVENTION

In light of what has been explained above, the general aim of the present invention is, therefore, to provide an innovative method based on SAR technology for the detection of deformations of, and/or damages to, structures of interest permanently arranged on the earth's surface that is able to overcome the aforementioned technical limits of the currently known techniques.

Furthermore, a first specific aim of the present invention is to provide an innovative method based on SAR technology for detecting deformations of, and/or damages to, structures of interest permanently arranged on the earth's surface that is able to guarantee a prompt detection of deformations of, and/or damages to, said structures of interest.

In addition, a second specific aim of the present invention is to provide an innovative method based on SAR technology for the detection of deformations of, and/or damages to, structures of interest permanently arranged on the earth's surface that does not require two or more remotely sensed SAR images with the same shooting geometry both before and after the occurrence of deformations and/or damages.

These and other aims are achieved by the present invention as it relates to a method for detecting deformations of, and/or damages to, structures permanently arranged on the earth's surface, as defined in the enclosed claims.

In particular, the method according to the present invention comprises:
acquiring georeferenced data indicative of geographical reference positions of predefined points of interest of a given structure to be monitored permanently arranged on the earth's surface, wherein said predefined points of interest are representative of a three-dimensional (3D) geometry of the given structure without deformations and damages;
acquiring a SAR image of an area of the earth's surface where the given structure is arranged, wherein said SAR image is associated with a given reference coordinate system;
transforming the geographical reference positions of the predefined points of interest into corresponding expected positions in the given reference coordinate system associated with the acquired SAR image so as to perform a reprojection of the 3D geometry of the given structure without deformations and damages on the acquired SAR image;

identifying the predefined points of interest of the given structure in the acquired SAR image;

determining actual positions in the given reference coordinate system associated with the acquired SAR image of the predefined points of interest identified in said SAR image;

making a comparison between the expected positions of the predefined points of interest and the corresponding actual positions in the acquired SAR image; and detecting one or more deformations of, and/or one or more damages to, said given structure on the basis of the comparison made.

BRIEF DESCRIPTION OF THE SEVERAL VIEWS OF THE DRAWINGS

For a better understanding of the present invention, some preferred embodiments, provided purely by way of explanatory and non-limiting example, will now be illustrated with reference to the enclosed (not to scale) drawings, in which.

DESCRIPTION OF SPECIFIC EMBODIMENTS OF THE INVENTION

The following description is provided to allow one skilled in the art to understand, implement and use the invention. Various modifications to the presented embodiments will be immediately apparent to skilled persons and the generic principles disclosed herein could be applied to other embodiments and applications without, however, departing from the scope of protection of the present invention as defined in the enclosed claims.

Therefore, the present invention must not be understood as limited only to the described and shown embodiments, but the widest scope of protection in accordance with the characteristics defined in the enclosed claims is to be granted thereto.

The present invention concerns a method for detecting deformations of, and/or damages to, structures or infrastructures of interest permanently arranged on the earth's surface which, unlike the techniques based on known SAR technology, does not require the use of at least one pair of remotely sensed SAR images with the same shooting geometry (one of which remotely sensed before the occurrence of the deformation(s) and/or damage(s) and the other after it), but is, instead, based on the use of single (typically post-deformation/damage) SAR images, thus overcoming the limitations of known techniques and thus making it possible to detect deformations and/or damages in less time compared to these latter, a characteristic that makes the use of the method according to the present invention particularly advantageous in all those cases wherein there is a strong need for a prompt detection of deformations of, and/or damages to, structures/infrastructures of interest, for example in the case of supports for low voltage (LV), medium voltage (MV) or high voltage (HV) overhead power lines.

Figure 1:
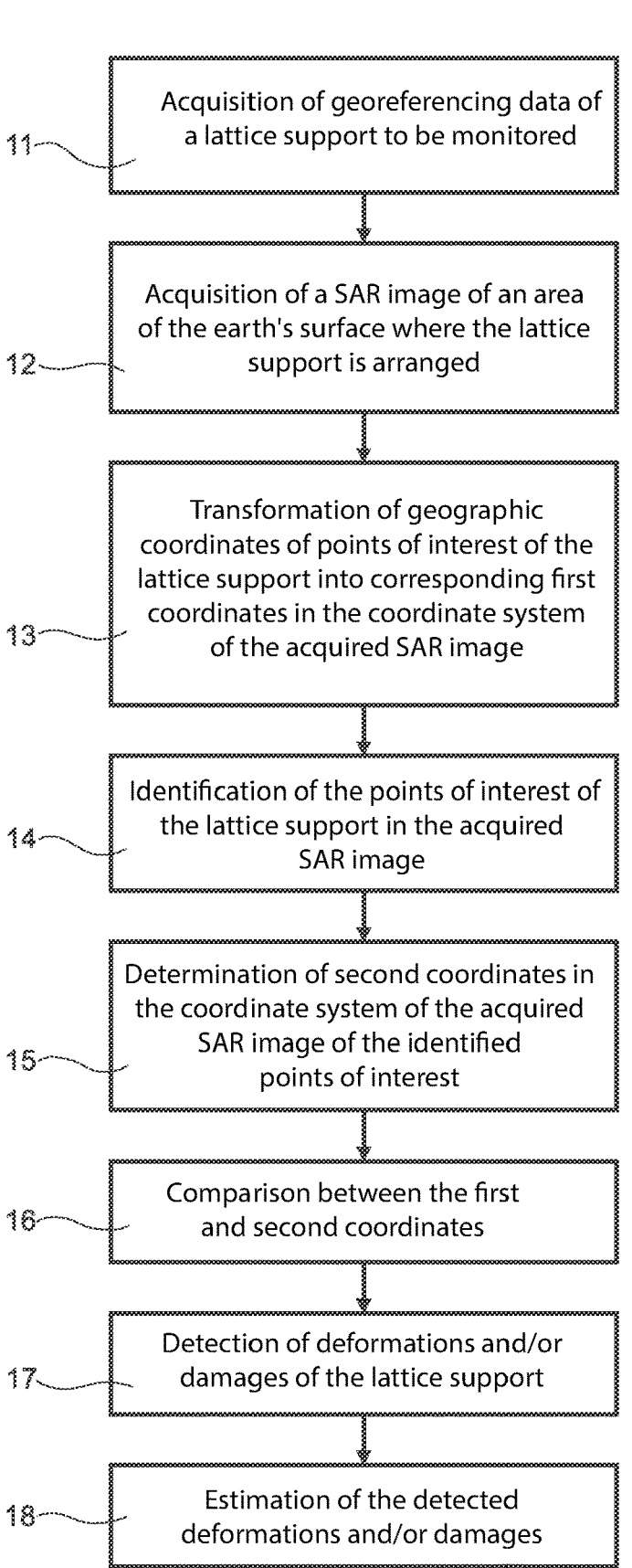
FIG. 1 schematically illustrates a method for detecting deformations of, and/or damages to, lattice supports of an overhead power line according to an embodiment of the present invention.

For a better understanding of the present invention, FIG. 1 schematically illustrates (in particular by means of a flow chart) a method (indicated as a whole by 1) for detecting deformations of, and/or damages to, lattice supports of an overhead power line (for example of the HV type) according to a preferred (but absolutely without any limitation or restriction) embodiment of the present invention.

In this regard, before proceeding with the detailed description of method 1, it is worth reminding that, as is known, a lattice support of an overhead power line has a lattice structure that typically includes:

a base anchored to the ground;

a head portion (often simply called "head") configured to support the conductors of the overhead power line, for example through the use of portions protruding laterally from the head which are known as "brackets" (so-called anchor supports); and a stem that extends between the base and the head.

Furthermore, again as it is widely known in the technical sector of reference, the lattice structure, in particular the base and/or the stem and/or the head (and/or the brackets, if any), of the lattice supports may have different shapes and sizes.

Returning, therefore, to what is illustrated in FIG. 1, the method 1 comprises:

acquiring geo-referencing data of a given lattice support to be monitored (block 11), wherein said georeferencing data are indicative of geographical reference coordinates of predefined points of interest of the given lattice support without deformations and damages;

acquiring a SAR image of an area of the earth's surface where the given lattice support is arranged (block 12), wherein said SAR image is associated with a given reference coordinate system;

transforming the geographical reference coordinates of the predefined points of interest of the given lattice support into corresponding first coordinates in the given reference coordinate system associated with the acquired SAR image (block 13);

identifying, in the acquired SAR image, the predefined points of interest of the given lattice support (block 14);

determining, in the given reference coordinate system associated with the acquired SAR image, the respective second coordinates of the predefined points of interest of the given lattice support identified in said SAR image (block 15);

making a comparison between the first and second coordinates of the predefined points of interest of the given lattice support (block 16);

detecting one or more deformations of, and/or one or more damages to the given lattice support on the basis of the comparison made (block 17); and, in case of detection of one or more deformations of, and/or of one or more damages to the given lattice support, making an estimate of the detected deformation(s) and/or of the detected damage(s) using one or more predefined artificial intelligence technologies (block 18).

Conveniently, the georeferencing data of the given lattice support are indicative of geographical reference coordinates of predefined notable points, or predefined control points, representative of the three-dimensional (3D) geometry of the structure (in particular, of the base, of the stem, of the head and, if any, also of the brackets) of said lattice support without deformations and damages.

Preferably, said georeferencing data of the given lattice support are obtained:

using one or more LIDAR (acronym for the well-known technology called "Light Detection And Ranging" or, alternatively, "Laser Imaging, Detection And Ranging") measurement techniques—for example, using airborne LIDAR sensors—in such a way as to obtain a 3D digital representation of the given lattice support without deformations and damages formed by a cloud of points geometrically arranged and spaced from each other in such a way to correspond to the real structure of said lattice support; and determining the geographic coordinates of predefined points of interest in the 3D digital representation of the given lattice support, i.e. in said point cloud.

In the event that the LIDAR measurements of the given lattice support are not available (or, alternatively, if it is desired to increase the accuracy of the georeferencing data of the given lattice support by using both the LIDAR-type measurements and additional measurement data), said georeferencing data can be conveniently obtained:

using (also) one or more predefined 3D reconstruction techniques based on the use of at least one pair of stereoscopic optical images of the given lattice support without deformations and damages, in order to obtain a (second) 3D digital representation of the given lattice support formed by a (second) cloud of points geometrically arranged and spaced from each other in such a way to correspond to the real structure of said lattice support; and determining the geographic coordinates of predefined points of interest in the (second) 3D digital representation of the given lattice support, i.e. in said (second) point cloud.

In an equivalent way, the georeferencing data can also be conveniently obtained on the basis of one or more photogrammetric and/or radargrammetric measurements of the given lattice support without deformations and damages.

In the event that neither the LIDAR measurements of the given lattice support, nor the stereoscopic optical images of said lattice support, nor the photogrammetric or radargrammetric measurements thereof are available, the georeferencing data can be conveniently obtained on the basis of data and/or information (as long as they are accurate) concerning:

the geometric characteristics of the given lattice support without deformations and damages (e.g. height, width of the head, type of support, etc.), in particular of the base, of the stem, of the head and, if any, of the brackets thereof; and the geographical position of at least one point of said lattice support.

In order to ensure a correct and reliable implementation of the method 1, it is convenient to use georeferencing data concerning few points until reaching some tens (in particular, a few tens) of points of interest (i.e. notable or control points) of the given lattice support. In this regard, it should be noted that, by using LIDAR-type measurements, it is possible to typically obtain point clouds having densities generally much greater than the minimum necessary for a correct and reliable implementation of the method 1 (which, as just explained, is already guaranteed by a few tens of points).

Regarding, instead, the single (conveniently post-deformation and/or post-damage) acquired SAR image (block 12), it is preferable to use (i.e. acquire) a high resolution SAR image, preferably at high resolution in azimuth. For this purpose, the images provided by the ICEYE sensor operating in Spotlight High mode, which are characterised by an azimuth resolution of 25 cm and a slant range resolution of 50 cm, or the images provided by the TerraSAR-X sensor operating in Staring Spotlight mode, which are characterised by an azimuth resolution of 24 cm and a slant range resolution of 60 cm, can be conveniently used. In the future, the single post-deformation and/or post-damage high-resolution SAR image may also be acquired by exploiting the new SAR constellations able to provide SAR images at resolutions comparable to or even higher than those of the current SAR constellations already operating. In this regard, it is mentioned, purely by way of example, the new SAR constellation by Capella Space whose SAR images remotely sensed in Spotlight mode are characterised by an azimuth resolution of 50 cm and a slant range resolution of 30 cm.

The SAR image acquisition step (block 12) can be conveniently implemented through the connection (for example via internet) to one or more databases (for example available online) which store satellite and/or aerial (preferably satellite) SAR images of the earth's surface, by searching, identifying and, therefore, acquiring, on the basis of a respective geographical position of the given lattice support, a SAR image of an area of the earth's surface where said lattice support is arranged.

In case of use of the method 1 for monitoring, i.e. for detecting deformations of, and/or damages to, a plurality of lattice supports, it is possible to conveniently acquire a single SAR image (block 12) related to an area of the earth's surface where all the lattice supports to be monitored are arranged, wherein said single SAR image can be conveniently selected/chosen on the basis of the respective shooting geometry by which said SAR image was remotely sensed, in order to minimise the number of lattice supports which are non-visible and/or affected by heavy perspective/geometric radar distortions (for example of the shadowing, foreshortening or layover type).

Regarding, instead, the step of transforming the geographical reference coordinates of the predefined points of interest of the given lattice support into corresponding first coordinates in the given reference coordinate system associated with the acquired SAR image (block 13), it is important to note that said step essentially implies carrying out a reprojection of the 3D geometry of the given lattice support on the acquired SAR image (whose respective shooting geometry by which it was remotely sensed is known), so as to make it possible to carry out the subsequent comparison step (block 16) and, therefore, the detection of any deformation and/or damage (block 17).

Said reprojection (block 13) can be conveniently implemented by carrying out, on the basis of the shooting geometry by which the acquired SAR image was remotely sensed, an inverse geocoding of the geographical reference coordinates of the predefined points of interest of the given lattice support to transform them into corresponding first coordinates in the given reference coordinate system associated with the acquired SAR image. Furthermore, in carrying out said inverse geocoding, it may also be convenient to use/exploit a predefined physical and/or mathematical model related to actual radiometric-type distortions due to the specific meteorological and/or atmospheric conditions existing when the acquired SAR image was remotely sensed.

Essentially, said reprojection (block 13) is carried out to obtain the expected position of the 3D geometry of the given lattice support in the SAR image—or, more precisely, the expected positions of the predefined points of interest of said given lattice support in the SAR image. Said expected positions (which are related to the absence of deformations and damages) are then compared (block 16) with the actual positions of the predefined points of interest of said lattice support obtained by analysing the backscattering signals of said predefined points of interest in the acquired SAR image (blocks 14 and 15). Therefore, if the given lattice support has suffered a deformation and/or damage, the aforementioned comparison (block 16) makes it possible to detect such deformation/damage (block 17), in particular if one or more expected positions differ from the corresponding actual position(s), or if they differ by more than a predefined threshold linked to the measurement error.

Figure 2:
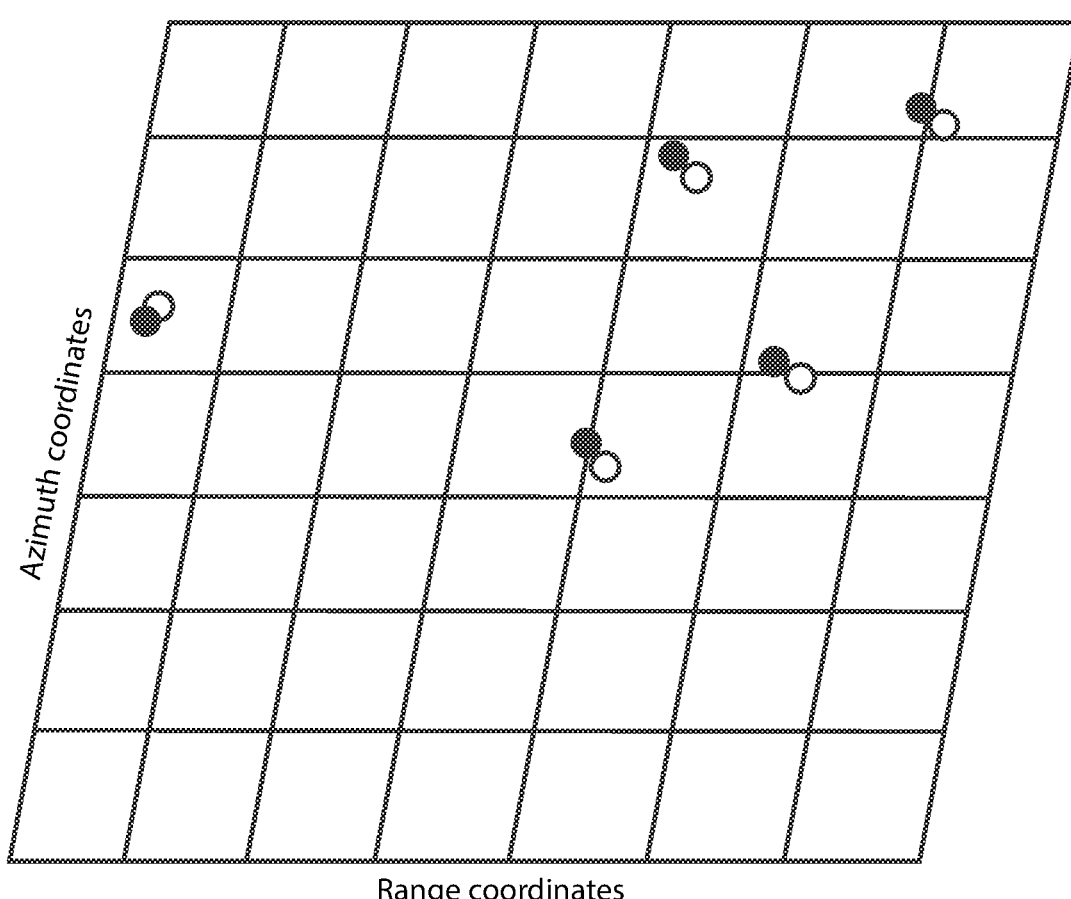
FIG. 2 schematically illustrates an example of comparison between expected and actual positions of a damaged lattice support in a single SAR image.

In this regard, FIG. 2 shows a schematic example of a result obtained by carrying out said comparison step (block 16) in relation to a lattice support that has suffered a damage such that the expected and actual positions of the relevant points of interest (i.e. of control) in the SAR image differ and, therefore, the presence of such damage is detected (block 17). Following this, it is also possible to make an estimate of the damage (block 18) on the basis of the differences between the expected positions and the corresponding actual positions, for example by calculating respective distances (e.g., expressed in metres) between the expected positions and the corresponding actual positions and making a damage estimate on the basis of the calculated distances.

Preferably, the step of estimating the detected deformation(s) and/or the detected damage(s) (block 18) is based on the use of one or more predefined artificial intelligence technologies.

More in detail, said estimation step (block 18) is conveniently implemented through one or more predefined artificial intelligence algorithms trained by means of one or more predefined machine learning techniques (of the supervised and/or unsupervised type) in such a way that said artificial intelligence algorithm(s) is/are configured to automatically estimate the type of deformation/damage suffered by the given lattice support through analysis, interpretation and classification of the differences between the expected positions and the actual positions of the predefined points of interest of said lattice support, also identifying the part or parts of the latter (e.g. base, stem, head and/or brackets) affected by said deformation/damage.

To this end, the method 1 conveniently also includes a preliminary training step of said artificial intelligence algorithm(s) (not illustrated in FIG. 1) to be carried out before the implementation of the other steps of said method 1 described above and represented in FIG. 1 by blocks 11-18.

Conveniently, the method 1 steps of identifying the predefined points of interest of the given lattice support in the acquired SAR image (block 14) and of determining the second coordinates in the given reference coordinate system associated with the acquired SAR image of the predefined points of interest identified in said SAR image (block 15) can be advantageously carried out in parallel with the step of calculating the first coordinates in the given reference coordinate system associated with the acquired SAR image of the predefined points of interest of the given lattice support (block 13).

Furthermore, once the SAR image has been acquired (block 12) and before carrying out the step of calculating the first coordinates in the given reference coordinate system associated with the acquired SAR image of the predefined points of interest of the given lattice support (block 13), the method 1 may conveniently also include a step of processing the acquired SAR image (not illustrated in FIG. 1), which comprises carrying out one or more predefined operations of processing of said acquired SAR image, such as amplitude calibration, reduction of the speckle noise, etc.

In the light of what has been explained above, it is absolutely apparent for one skilled in the art that the method 1 can be used, mutatis mutandis, to detect deformations of, and/or damages to, a plurality of lattice supports or overhead power line supports also of another type (i.e. not lattice-type), as well as for the detection of deformations of, and/or damages to, other types of structures/infrastructures of interest permanently arranged on the earth's surface.

The method 1 may be conveniently implemented by means of a processing device or system (e.g., a computer, a laptop, a server or a cloud computing system) suitably programmed through one or more predefined software programs such as to ensure that, when performed by the processing device/system, the latter carries out said method 1.

From the foregoing specification, the many innovative characteristics and the innumerable technical advantages of the present invention are immediately apparent for one skilled in the art.

In particular, it is important to underline that the present invention makes it possible to overcome the limitations of the known techniques which exploit the SAR technology for the detection of deformations.

In fact, the method according to the present invention uses single, typically post-deformation or post-damage, SAR images for detecting deformations/damages, unlike the known techniques which, instead, require at least one pair of remotely sensed images with the same shooting geometry, one of which is a pre-deformation image and the other is a post-deformation image.

In this way, the present invention guarantees the detection of deformations/damages in less time compared to the currently known techniques. For this reason, the method according to the present invention finds advantageous (although not exclusive) application in all those cases wherein it is strongly required a prompt detection of deformations of, and/or damages to, structures/infrastructures of interest, for example in the case of supports for LV, MV or HV overhead power lines.

Furthermore, the method according to the present invention makes it possible to detect and estimate deformations of, and/or damages to, structures/infrastructures of interest completely automatically, i.e. without requiring any intervention from a human operator.

In conclusion, it is important to note that, although the invention described above makes particular reference to well-defined embodiment examples, it is not to be considered limited to such embodiment examples, as all variants, modifications, simplifications or generalisations, which are covered by the enclosed claims, fall within its scope.

In this regard, it is important to underline once again that the method according to the present invention can be advantageously exploited, without requiring any substantial modification, to detect deformations of, and/or damages to, any type of structures or infrastructures permanently arranged on the earth's surface, for example deformations of, and/or damages to, supports of overhead power lines, which were explicitly referred to in the previous description just for simplicity and purely by way of example (but absolutely without any limitation or restriction).

In fact, the method according to the present invention can be advantageously used to detect deformations of, and/or damages to, any type of structure/infrastructure of interest, such as structures/infrastructures installed/mounted on, and anchored to, the ground (e.g., buildings, bridges, viaducts, dams, etc.), as well as permanent structures/infrastructures of the offshore type (i.e. arranged in the open sea), for example oil platforms anchored to the seabed.

What is claimed is:

1. A method for detecting deformations of structures permanently arranged on the earth's surface, said structures comprising lattice supports of an overhead power line, said method comprising:

a) acquiring georeferenced data indicative of geographical reference positions of predefined points of interest of a lattice support to be monitored permanently arranged on the earth's surface, wherein the lattice support comprises a plurality of parts including a base anchored to the ground, a head configured for supporting the overhead power line, and a stem that extends between the base and the head, wherein said predefined points of interest are representative of a three-dimensional geometry of the lattice support including the base, the stem and the head without deformations and damages;

b) acquiring a single post-deformation synthetic aperture radar (SAR) image of an area of the earth's surface where the lattice support is arranged, wherein said single post-deformation SAR image is associated with a given reference coordinate system;

c) transforming the geographical reference positions of the predefined points of interest into corresponding expected positions in the given reference coordinate system associated with the acquired single post-deformation SAR image so as to perform a reprojection of the three-dimensional geometry of the lattice support without deformations and damages on the acquired single post-deformation SAR image;

d) identifying the predefined points of interest of the lattice support in the acquired single post-deformation SAR image;

e) determining one or more actual positions in the given reference coordinate system associated with the acquired single post-deformation SAR image of the predefined points of interest identified in said single post-deformation SAR image, said one or more actual positions identifying at least one part of said plurality of parts of the lattice support, that is affected by said deformation;

f) making a comparison between the expected positions of said lattice support of the predefined points of interest and the one or more corresponding actual positions in the single post-deformation acquired SAR image of said lattice support; and g) detecting one or more deformations of said lattice support on the basis of the comparison made.

2. The method of claim 1, wherein step g) includes detecting one or more deformations of said lattice support if one or more expected positions differ from the one or more corresponding actual positions, or if one or more expected positions differ from the one or more corresponding actual positions by more than a predefined threshold.

3. The method according to claim 1, comprising:

h) in case of detection of a deformation, making an estimate of said deformation detected on the basis of differences between the expected positions and the actual positions.

4. The method of claim 3, wherein step h) is implemented using one or more predefined artificial intelligence technologies.

5. The method of claim 4, wherein step h) is implemented through one or more predefined artificial intelligence algorithms trained using one or more predefined machine learning techniques in such a way that, once trained, said one or more artificial intelligence algorithms is/are configured to automatically estimate the type of deformation suffered by the lattice support through analysis, interpretation, and classification of the differences between the expected positions and the actual positions.

6. The method of claim 5, wherein, once trained, said one or more artificial intelligence algorithms are also configured to automatically identify one or more parts of the lattice support affected by the detected deformation.

7. The method according to claim 5, comprising a preliminary step of training said one or more artificial intelligence algorithms by the one or more predefined machine learning techniques.

8. The method according to claim 1, wherein the georeferencing data are obtained:

on the basis of at least one of:

one or more LIDAR measurements of the lattice support without deformations and damages, and using one or more predefined three-dimensional reconstruction techniques based on at least one pair of optical stereoscopic images of the lattice support without deformations and damages, one or more photogrammetric of the lattice support without deformations and damages, and radargrammetric measurements of the lattice support without deformations and damages, and data concerning the three-dimensional geometry of the lattice support without deformations and damages, and at least one geographical position of reference of that lattice support.

9. A non-transitory computer-readable medium storing instructions to execute the method as claimed in claim 1.

10. A non-transitory computer-readable medium storing one or more portions of software code which when executed by a processing device or system, cause said processing device/system to execute the method as claimed in claim 1.

* * * * *